(12) United States Patent
Duvall et al.

(10) Patent No.: US 6,882,495 B2
(45) Date of Patent: Apr. 19, 2005

(54) WEAR REDUCTION OF A DISC SURFACE USING AN ADAPTIVE DITHER PROCESS

(75) Inventors: Matthew G. Duvall, Oklahoma City, OK (US); James W. DuLaney, Oklahoma City, OK (US); Ryan T. Lyle, Oklahoma City, OK (US); Wonbo Shim, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 394 days.

(21) Appl. No.: 10/183,290

(22) Filed: Jun. 27, 2002

(65) Prior Publication Data

US 2003/0107835 A1 Jun. 12, 2003

Related U.S. Application Data

(60) Provisional application No. 60/338,898.

(51) Int. Cl.[7] .............................................. G11B 21/12
(52) U.S. Cl. ........................................................ 360/75
(58) Field of Search ................................ 360/75, 78.04, 360/78.06, 78.08, 78.12, 256, 256.2; 318/126, 128, 129, 466, 281, 282

(56) References Cited

U.S. PATENT DOCUMENTS

| 5,315,455 A | * | 5/1994 | Ito ................................ 360/75 |
| 5,384,675 A | | 1/1995 | Crawforth et al. ............ 360/75 |
| 5,600,219 A | * | 2/1997 | Gomez ........................ 360/75 |
| 5,801,505 A | | 9/1998 | Lee et al. ...................... 360/75 |
| 5,828,522 A | | 10/1998 | Brown et al. ................. 360/75 |
| 5,859,738 A | | 1/1999 | Forehand et al. ............. 360/75 |
| 5,982,571 A | | 11/1999 | Calfee et al. ................. 360/75 |
| 6,002,549 A | | 12/1999 | Berman et al. ............... 360/75 |
| 6,075,671 A | * | 6/2000 | Yoneda et al. ................ 360/75 |
| 6,122,131 A | | 9/2000 | Jeppson ................... 360/77.02 |
| 6,154,340 A | | 11/2000 | Cameron ...................... 360/75 |
| 6,252,364 B1 | * | 6/2001 | Chiang et al. .............. 318/561 |
| 6,301,080 B1 | | 10/2001 | Boutaghou .................... 360/75 |
| 6,674,604 B1 | * | 1/2004 | Teng et al. .............. 360/78.04 |
| 2002/0044388 A1 | | 4/2002 | Misso et al. ............. 360/265.1 |

FOREIGN PATENT DOCUMENTS

| JP | 406267222 A | * | 9/1994 |
| JP | 2000048506 A | * | 2/2000 |

* cited by examiner

*Primary Examiner*—David Hudspeth
*Assistant Examiner*—James L Habermehl
(74) *Attorney, Agent, or Firm*—Fellers, Snider, et al.

(57) ABSTRACT

Method and apparatus for reducing and dispersing wear to the surface of a rotatable disc in a disc drive using an adaptive dither process. The disc drive includes an actuator assembly that is secured in a parked position by a latch when not in use. The method includes determining an open latch current required to open the latch as the actuator assembly is moved from the parked position to a position over a user data storage portion of the disc. A dither current is subsequently applied to the actuator assembly to induce a reciprocating lateral displacement of the actuator assembly when the actuator assembly is secured in the parked position, wherein the maximum amplitude of the dither current is selected to be less than the open latch current.

17 Claims, 5 Drawing Sheets

WEAR REDUCTION OF A DISC SURFACE USING AN ADAPTIVE DITHER PROCESS

RELATED APPLICATIONS

This application claims priority to U.S. Provisional Application No. 60/338,898 filed Dec. 10, 2001, entitled Voice Coil Motor Dither During Drive Spinup.

FIELD OF THE INVENTION

This invention relates generally to the field of data storage devices, and more particularly, but not by way of limitation, to incorporation of a method for wear reduction and dispersion of a disc surface through adaptive actuator assembly dither.

BACKGROUND

Disc drives are used for data storage in modern electronic products ranging from digital cameras to computer systems and networks. Typically, a disc drive includes a mechanical portion, or head disc assembly (HDA), and electronics in the form of a printed circuit board assembly (PCB), mounted to an outer surface of the HDA.

The PCB controls HDA functions and provides an interface between the disc drive and its host. Generally, the HDA comprises one or more magnetic discs affixed to a spindle motor assembly for rotation at a constant speed, an actuator assembly supporting an array of read/write heads that traverse generally concentric data tracks radially spaced across the disc surfaces and a voice coil motor (VCM) providing rotational motion to the actuator assembly.

During use, each of the read/write heads is supported by an air bearing that is created by the rapid rotation of the adjacent disc. One approach taken by disc drive manufacturers to increase recording density is through reduction of the fly height of the read/write heads. Reducing the fly height of the read/write heads decreases the surface area each occupied by data, thereby increasing number of bits capable of being stored on the surface area of the disc. As discussed below, however, a reduction in fly height may frustrate efforts to launch the read/write heads from a parked position into flight.

When the disc drive is not in use, the read/write heads are typically landed and brought to rest in a landing zone, which is generally located near the inner diameter of the recording surface. In landing the read/write head, the read/write head is flown over the landing zone and the rotation of the spindle motor is gradually stopped. Once the read/write heads are "parked" in the landing zone, it is advantageous to secure the actuator assembly with a latching arrangement to prevent the read/write head from subsequently moving out onto the data storage zone of the disc while the disc drive is non-operational.

In most applications, the landing zone has a textured surface to mitigate a phenomenon referred to as "stiction," which is an adhesion of the read/write head to the rotatable disc surface as a result of two smooth surfaces coming in contact with each. One method of providing this non-smooth surface is to texturize the landing zone using a laser beam. The laser beam is held at an energy output level sufficient cause a plurality of minute eruptions that form a plurality of peaks and pits on the otherwise smooth rotatable disc surface. The result of the process is a laser-textured landing zone.

Subsequent to the texturing process, a carbon overcoat is applied to the surface of the disc. The carbon overcoat serves as a wear surface between the read/write head and the magnetic recording layer of the disc. Breakdown of a carbon overcoat leads to corrosion of the magnetic recording layer, which can eventually render the entire rotatable disc surface inoperable as a magnetic storage medium.

The height of the peaks in the textured landing zone is typically controlled to be no greater than a nominal fly height of read/write head. Therefore, as fly heights of the read/write heads decrease, the height of the peaks should also decrease. The decrease in height of the peaks decreases the efficacy of the landing zone in mitigating stiction. An increase in stiction between the read/write head and the landing zone results in extended contact time between the read/write head and the surface of the disc. The extended contact time accelerates wear of the carbon overcoat, which reduces the operating life of the disc drive.

There is therefore a continued need for improvements in the art directed to reducing and dispersing wear caused by contact between read/write head and a rotatable disc surface to extend the operating life of a disc drive.

SUMMARY OF THE INVENTION

The present invention (as embodied herein and as claimed below) is generally directed to an apparatus and method for reducing and dispersing wear to the surface of a rotatable disc using an adaptive dither process.

In accordance with preferred embodiments, a disc drive includes an actuator assembly which supports a head adjacent a rotatable disc. The actuator assembly moves the head across the disc surface in response to application of current to an actuator motor. The actuator assembly is secured in a parked position by a toggle latch when not in use.

The method includes determining an actuator motor open latch current magnitude required to open the latch as the actuator assembly is moved from the parked position to a position over a user data storage portion of the disc. A dither current is subsequently applied to the actuator assembly to induce a reciprocating lateral displacement of the actuator assembly when the actuator assembly is in the parked position and the head is in contact with the disc surface. The maximum magnitude of the dither current is selected in relation to the determined open latch current magnitude.

In this way, the actuator assembly can safely contact the latch during dithering without exerting sufficient force to open the latch and inadvertently move the heads out onto the user data portion of the disc. Preferably, the open latch current is measured each time the latch is opened to account for changes in system parameters over time and ensure the dither current remains at a safe level.

These and various other features and advantages which characterize the present invention will be apparent from a reading of the following detailed description and a review of the associated drawings.

DETAILED DESCRIPTION

Figure 1:
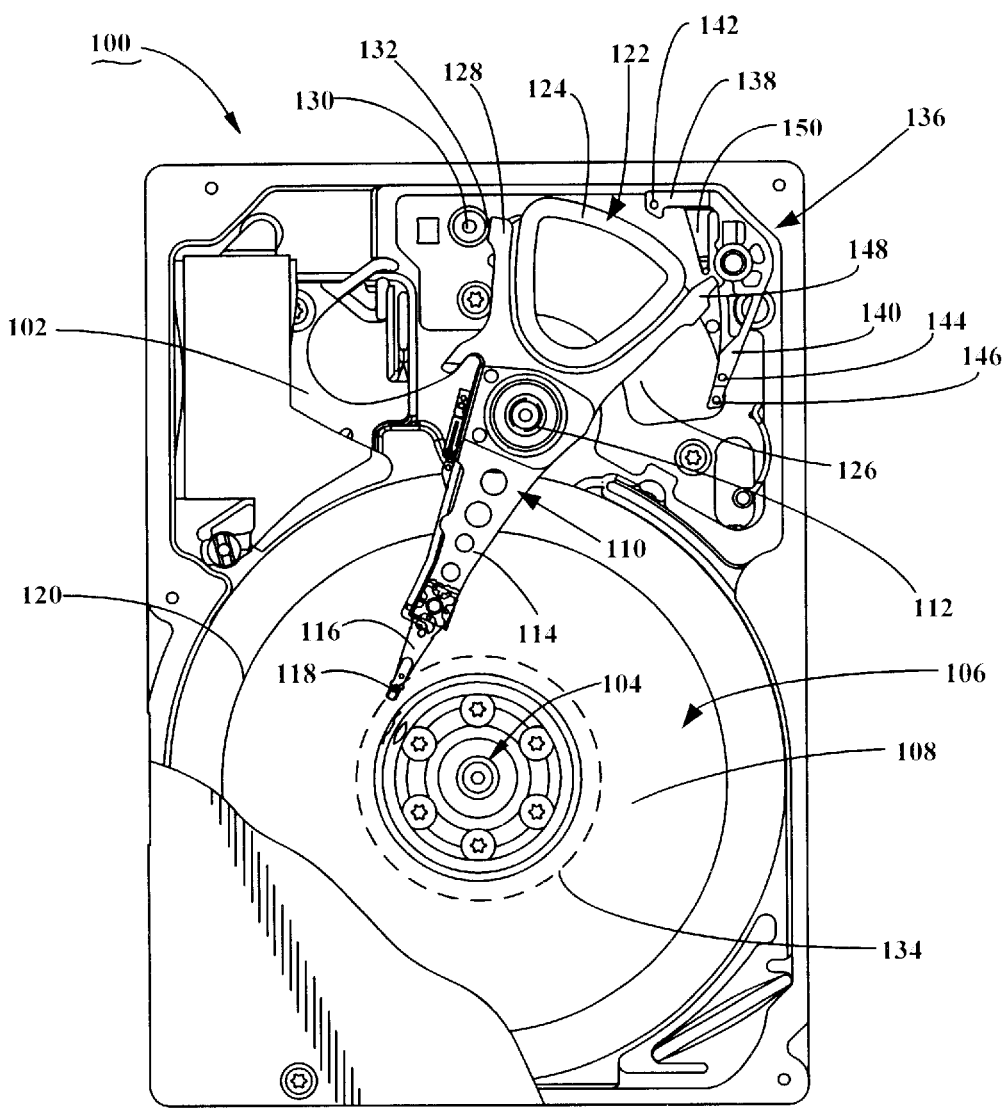
FIG. 1 is a top plan view of a disc drive incorporating a method for reducing wear in a disc drive through adaptive head stack dither.

FIG. 1 shows a top view of a disc drive 100 constructed in accordance with preferred embodiments of the present invention. The disc drive 100 includes a basedeck 102 supporting various disc drive components, including a spindle motor assembly 104.

The spindle motor assembly 104 supports at least one axially aligned rotatable disc 106 having a disc surface 108. Adjacent the disc 106 is an actuator assembly 110 (also referred to as a actuator assembly (HSA)), which pivots about an actuator motor support 112 (also referred to as a bearing assembly).

The actuator assembly 110 includes at least one actuator arm 114 that supports a load arm (flexure) 116, which in turn typically supports at least one read/write head 118 (also referred as head 118) adjacent the disc surface 108. Each rotatable disc surface 108 is divided into concentric circular data tracks 120 (only one shown) over which the read/write head 118 is positionably located.

The actuator assembly 110 is controllably positioned by an actuator motor 122 (also referred to as a voice coil motor assembly (VCM)), which includes an actuator coil 124 immersed in the magnetic field generated by a magnet assembly 126. As the actuator coil 124 moves, the actuator assembly 110 pivots about the bearing assembly 112, causing the head 118 to move over the surfaces of the discs 106, thereby achieving a positioning of the head 118 adjacent a selected data track 120 of the disc surfaces 106.

During a shutdown operation, the disc drive 100 positions an actuator stop 128 adjacent a crash stop 130 that includes a compressible, resilient bumper 132, while positioning the read/write head 118 adjacent a textured landing zone 134 and places the actuator assembly 110 in a parked position. The landing zone 134, shown by dashed lines, is several times the width of the data track 120. A latch 136 secures the actuator assembly 110 in the parked position, while the disc drive slows and stops the spindle motor assembly 104.

The latch 136 preferably comprises a forward arm 138 and a trailing arm 140. A first ferromagnetic member 142 is attached or molded into the forward arm 138. Second and third ferromagnetic members, 144 and 146, respectively, are attached or molded into the trailing arm 140. When the heads 118 are moved over the landing zone 134, a contact arm 148 on the actuator assembly 110 engages a contact post 150, thereby urging the latch 136 to its latched position.

To open the latch 136, the actuator assembly 110 is powered to move towards the recording surfaces at the outer diameters of the discs 106 whereby the contact arm 148 engages the trailing arm 140. When opened, the first ferromagnetic member 142 enters the flux field generated by the magnet assembly 126, thereby preventing interference of the latch 136 with the function of the actuator assembly 110 during the operation of the disc drive 100. Although the latch 136 has been described above for the purposes of the present disclosure, it will be understood that other toggle latches can readily be used with the present invention.

Figure 2:
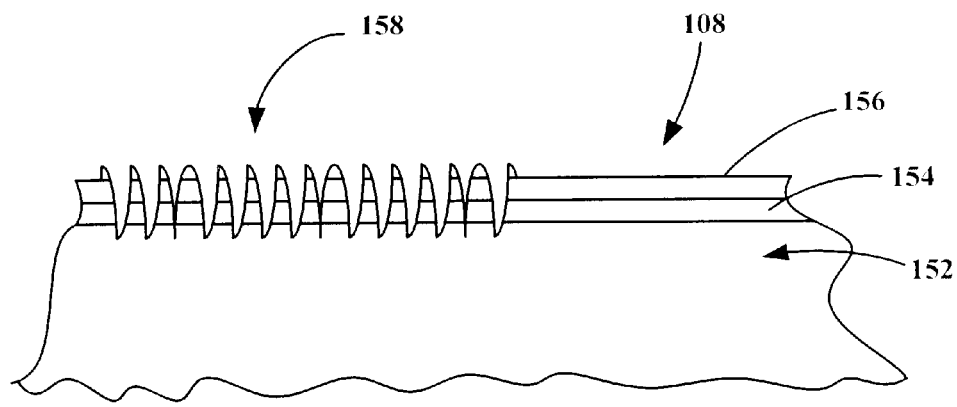
FIG. 2 is an elevational partial cross-sectional view showing a carbon overcoat adjacent to a magnetic layer, which in turn is supported by a substrate of the rotatable disc surface of the disc drive of FIG. 1.

FIG. 2 shows a substrate 152 of the rotatable disc surface 108 that includes a magnetic layer 154 and a carbon overcoat 156 (not drawn to scale). The substrate 152 is typically provided with an aluminum alloy or glass composition, but such is not limiting. The magnetic layer 154 of the rotatable disc surface 108 provides the medium for reading and writing data to the rotatable disc surface 108 using the read/write head 118. The carbon overcoat 156 protects the magnetic layer 154 against corrosive elements within the operating environment of the disc drive 100 and inhibits wear to the disc surface 108 caused by the repeated take-off and landing of the read/write head 118.

A textured portion 158 of the landing zone 134 provides a non-smooth surface that decreases stiction between the read/write head 118 and rotatable disc surface 108. In order to decrease fly height of the read/write head 118 as a way of increasing areal data storage densities, the peaks of the textured portion 158 preferably extend no taller than the nominal fly height of the read/write head 118. As such, as fly heights continue to decrease, the degree to which the textured portion 158 can extend above the balance of the disc surface 108 correspondingly decreases. The textured portion 158 is preferably produced through laser-induced eruption of the disc surface 108.

Figure 3:
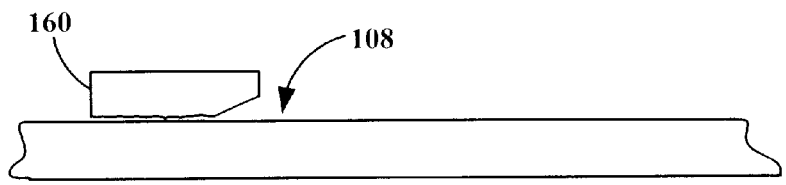
FIG. 3 is an elevational partial cross-sectional view showing a typical wear pattern in the carbon overcoat of FIG. 2.

Additionally, or in the alternative, the read/write head 118 can be outfitted with a padded slider 160, as shown in FIG. 3, to counteract the increased surface area contact between the landing zone 134 and the read/write head 118. The inclusion of the padded slider 160 to the read/write head 118 permits production of the rotatable disc surface 108 without having to submit the substrate 152 to a laser texturing process.

Figure 4:
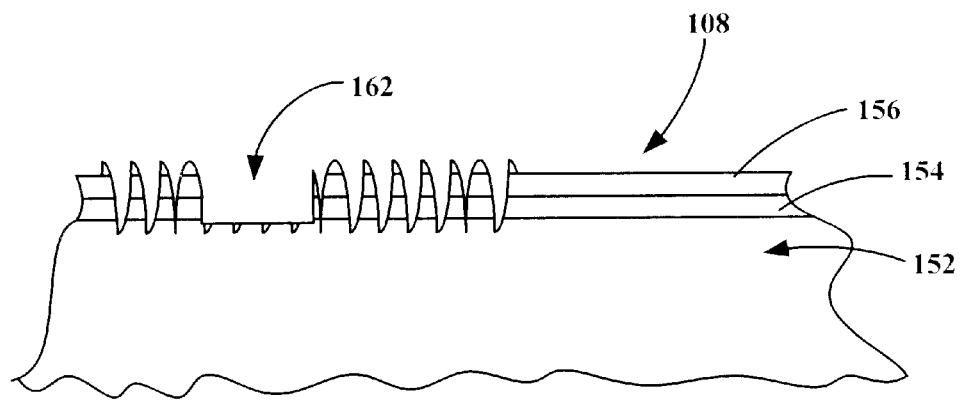
FIG. 4 is an elevational partial cross-sectional view showing a wear pattern of the present invention in the carbon overcoat of FIG. 2.

Turning next to FIG. 4, shown therein is a wear pattern 162 between a read/write head 118 and the textured portion 158 of the landing zone 134. The wear pattern 162 is a result of techniques employed in the prior art that position and maintain the head 118 in substantially the same region of the landing zone 134 during contact start and contact stop (CSS) activities of the disc drive 100. Over time, the surface of the carbon overcoat 156 is eroded as a result of repeated CSS activities, thereby exposing the magnetic layer 154 to corrosion. Extended exposure of the magnetic layer 154 can result in an inability to store data.

Figure 5:
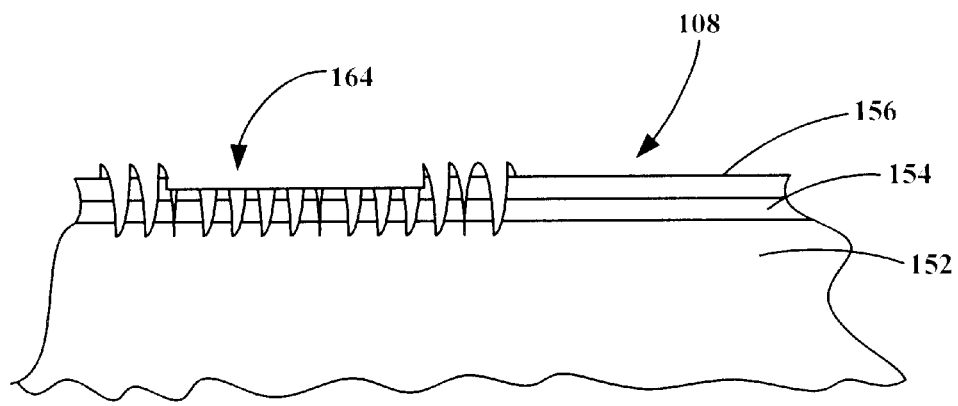
FIG. 5 is an elevational partial cross-sectional view showing a read/write head with a padded slider adjacent a non-textured landing zone of the disc drive of FIG. 1.

In contrast, FIG. 5 shows a typical wear pattern 164 resulting from the implementation of the inventive adaptive head stack dithering method. Because the carbon overcoat 156 in both figures has sustained an approximately equal period of CSS time, the overall amount of wear sustained by the carbon overcoat 156 in FIG. 4 is approximately equal to the amount of wear sustained by the carbon overcoat 156 in FIG. 5. However, it is noted that the wear pattern 162 is distributed over a larger surface area of the landing zone 134 and that the magnetic layer 154 remains shielded by the carbon overcoat 156. Thus, distributing the wear across a larger surface area of the landing zone 134 extends the useful life of the carbon overcoat 156, thereby prolonging the life of the disc drive 100.

To alleviate the wear induced by repeatedly positioning the head 118 at the same radial position, it is desirable to laterally reciprocate, or "dither," the actuator assembly 110 while the head 118 is positioned within the landing zone 134 as the disc 106 revolves. As the head 118 is dithered, the head traces an oscillatory path around the landing zone 134, thereby dispersing contact between the head 118 and the disc surface 108 over a larger area.

To ensure that the same path is not retraced as the disc 106 revolves, the frequency of the dither movement is preferably selected to be out-of-phase with the rotation of the disc 106. For example, in a disc drive employing a 7,200 revolutions-per-minute (rpm) spindle motor, the frequency of the dither movement can be selected to be about 60 Hz.

In addition to dispersing the wear, dithering the read/write head 118 during the initiation of the spin up of the spindle motor assembly 104 reduces the actual take off time of the read/write head 118 from the landing zone 134. The dither motion facilitates the development of hydrodynamic lift and the air bearing between the read/write head 118 and the disc surface 108 by breaking adverse stiction forces. Lowering the amount of time required to bring the read/write head 118 to flight lowers the amount of contact time during spinup and reduces the resulting wear on the disk surface 108.

The dither motion is preferably achieved by applying a current to the actuator coil 124 in accordance with a selected current profile. The current profile has a selected amplitude, frequency and direction.

Figure 6:
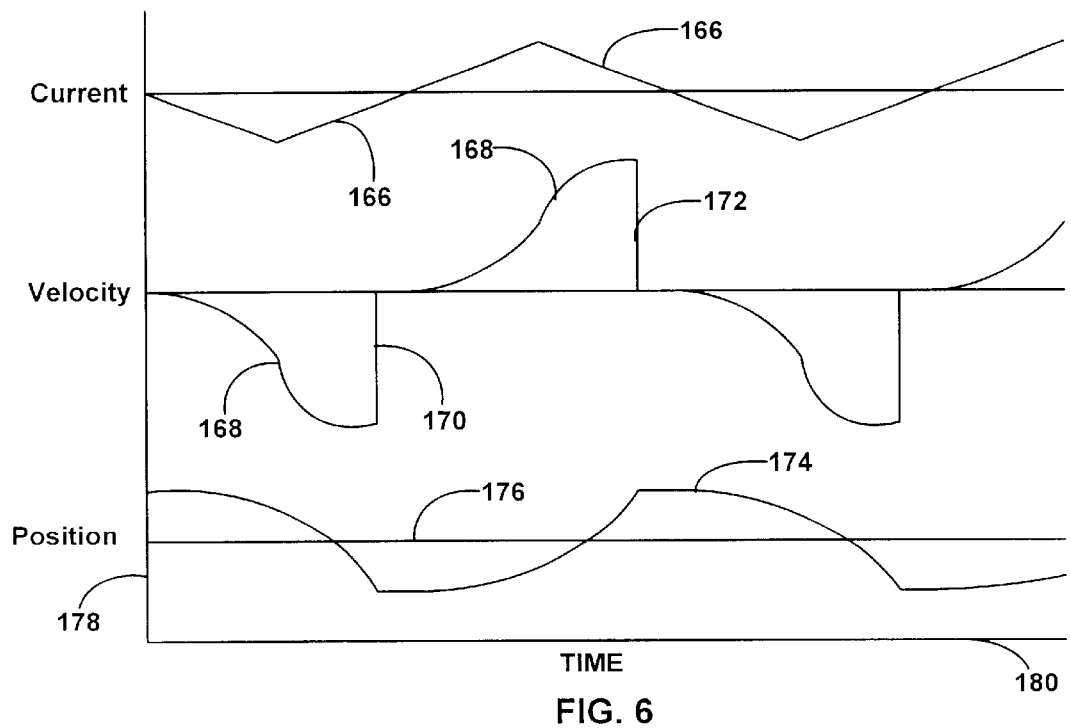
FIG. 6 is a graphical presentation of the current, velocity and position of a preferred dither signal.

As shown in FIG. 6, a sawtooth waveform 166 current profile can be used to produce the dithered movement. To maximize the dispersion of wear across the landing zone 134, the amplitude and period of the waveform 166 are preferably selected such that the actuator assembly 110 contacts the crash stop 128 and latch 136. It will be noted, however, that in an alternate embodiment of the present invention, the current is configured such that the actuator assembly 110 does not contact the latch 136 or crash stop 130 during the dither motion.

The lateral velocity of the read/write 118 head resulting from the application of the sawtooth waveform 166 is represented as the velocity profile 168. During the pre-scribed dither movement, the velocity of the read/write head 118 gradually increases until the actuator stop 128 comes in contact with the crash stop (at point 170) or the contact arm 148 comes in contact with the latch (172).

The direction of the applied current then reverses, causing the actuator assembly 110 to pivotally rotate to its other limit. The radial position of the read/write head 118 is plotted as position curve 174 relative to a centerline 176. The sawtooth waveform 166, velocity profile 168 and position plot 174 are plotted on a common y-axis 178 against time on an x-axis 180.

Figure 7:
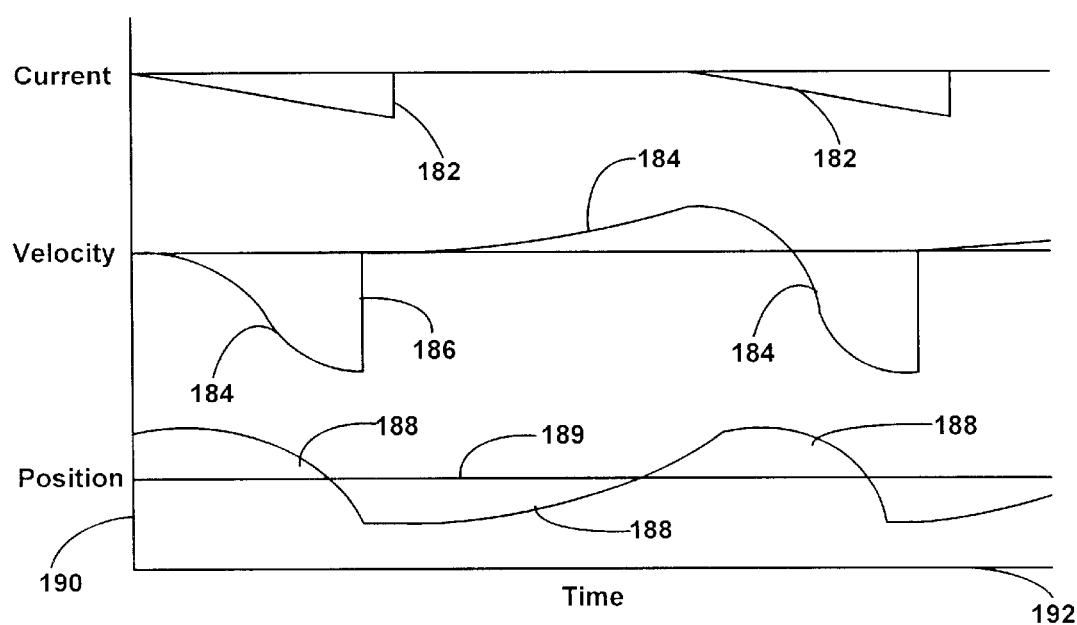
FIG. 7 is a graphical presentation of the current, velocity and position of an alternatively preferred dither signal.

In contrast to the sawtooth waveform 166 depicted in FIG. 6, a half-period waveform 182 current profile is depicted in FIG. 7. Rather than applying current in two directions, as shown in the sawtooth waveform 166, the half-period waveform 182 only applies current in a single direction, thereby driving the actuator assembly 110 against the crash stop 130. The actuator assembly 110 is drawn back toward the latch 136 by bias forces in the system.

Velocity profile 184 represents the radial movement of the actuator assembly 140 in response to the application of current in accordance with the half-period waveform 182. The rapid reduction in velocity at point 186 represents the impact of the actuator stop 128 against the crash stop 130. Curve 188 depicts the radial position of the read/write head 118 during the dither current executed with the half-period waveform 182 relative to a centerline 189. The half-period waveform 182, velocity profile 182 and position curve 188 are plotted on a common y-axis 190 against time on an x-axis 192.

As discussed above, to maximize the dispersion of wear to the disc surface 108, the actuator assembly 110 may contact the latch 136 during the dither operation. It is preferred, of course, that the latch 136 remain closed during the dither operation. If the latch 136 opens during the dither operation while the read/write head 118 is in contact with landing zone 134, the read/write head 118 may move out over the user data storage portion of the disc 106, thereby damaging the disc surface 108.

The latch 136 is opened by powering the actuator motor 122 to move the actuator assembly 110 toward the latch 136, where the contact arm 148 engages the trailing arm 140. The force created by applying current to the actuator coil 114 must be sufficient to overcome the magnetic attraction of the second and third ferromagnetic members 144, 146 to the magnet assembly 126.

The total force required to open the latch 136 is a combination of the force resulting from the dissipation of kinetic energy of the actuator assembly 110 upon impact with the latch 136 and the force applied by the actuator coil 114 after impact. Because the motion of the actuator assembly 110 is relatively small, however, the kinetic energy of the actuator assembly 110 is typically insignificant in comparison to the force generated by the application of current to the actuator coil 114. As such, the force required to open the latch 136 is accurately estimated as a function of the current applied to the actuator coil 114.

Figure 8:
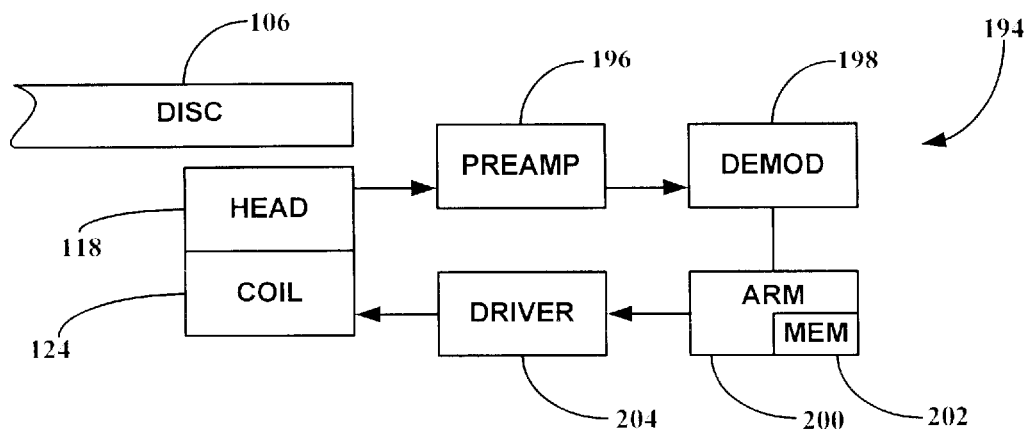
FIG. 8 is a functional block diagram of the servo control circuit of the disc drive of FIG. 1.

FIG. 8 provides a functional block diagram of a servo control circuit 194 used to control position of the actuator assembly 110. Servo data transduced from the head 118 are preamplified by a preamplifier/driver circuit 196 and conditioned by a demodulator circuit (demod) 198 for use by a programmable ARM device (advanced RISC (reduced instruction set computer) machine) 200.

The ARM 200 uses programming stored in ARM memory 202 as well as command inputs from a top level processor (not shown) to calculate an appropriate digital current command value (current) indicative of the desired current to be applied to the actuator coil 124. The current command value (control effort) is provided to a driver circuit 204 which applies the corresponding current to the actuator coil 124.

Figure 9:
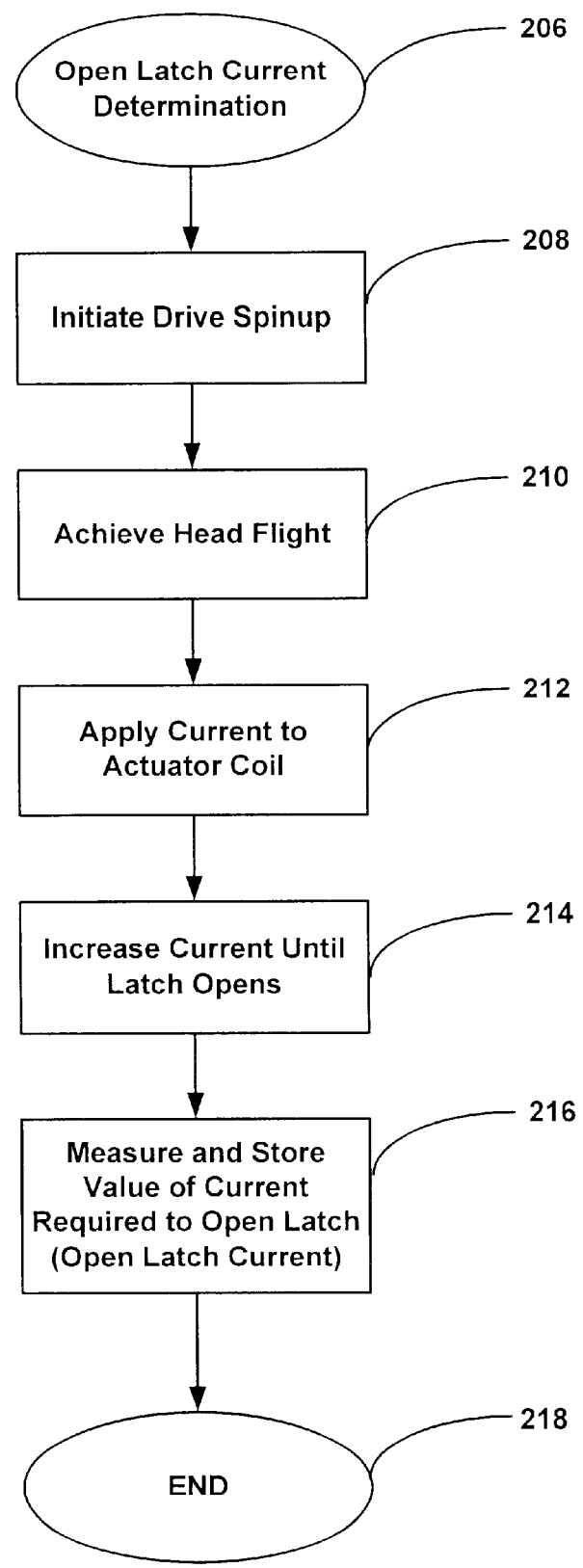
FIG. 9 is a flow diagram showing steps for calculating the threshold current required to open the latch of the disc drive shown in FIG. 1.

Turning to FIG. 9, shown therein is an OPEN LATCH CURRENT DETERMINATION routine 206 for determining the amount of current required to open the latch 136 with the actuator assembly 110 (the "Open Latch" current). The routine 206 preferably represents programming stored in the ARM memory 202 and executed by the ARM 200.

Initially, the actuator assembly 110 is latched, with the head 118 parked in the landing zone 134 and the spindle motor assembly 104 is at rest. At step 208, power is applied to the spindle motor assembly 104 to cause the disc 106 to initiate rotation. When the disc 106 has reached sufficient rotational speed, the currents of air adjacent the disc surface 108 cause the head 118 to rise from the landing zone 134 and achieve aerodynamic flight, step 210.

Once airborne, current is applied to the actuator coil 124 to move the head 118 in a direction toward the outer diameter of the disc 106, step 212. The current causes the contact arm 148 of the actuator assembly 110 to press against the latch 136, and the current is increased until the second and third ferromagnetic members 144, 146 are pushed beyond the field of flux generated by the magnet assembly 126 and the latch 136 toggles to the open position, as indicated by step 214.

At step 216, a value indicative of the magnitude of current required to open the latch 136 (the "Open Latch" current) during step 214 is identified and stored in the memory 202 of the ARM device 200, after which the routine ends at step 218. The value stored during step 216 (referred to as the Open Latch Current Threshold) can represent the maximum magnitude of applied current, or can be a derated value (such as a selected percentage of the Open Latch current).

Because the Open Latch current may vary over time in relation to a number of factors, including operating temperature and degradation of the magnet assembly 126, actuator coil 124 or latch 136, the Open Latch current is preferably determined on a frequent basis. In a particularly preferred embodiment, the Open Latch current is determined each time the actuator assembly 110 opens the latch 136.

Figure 10:
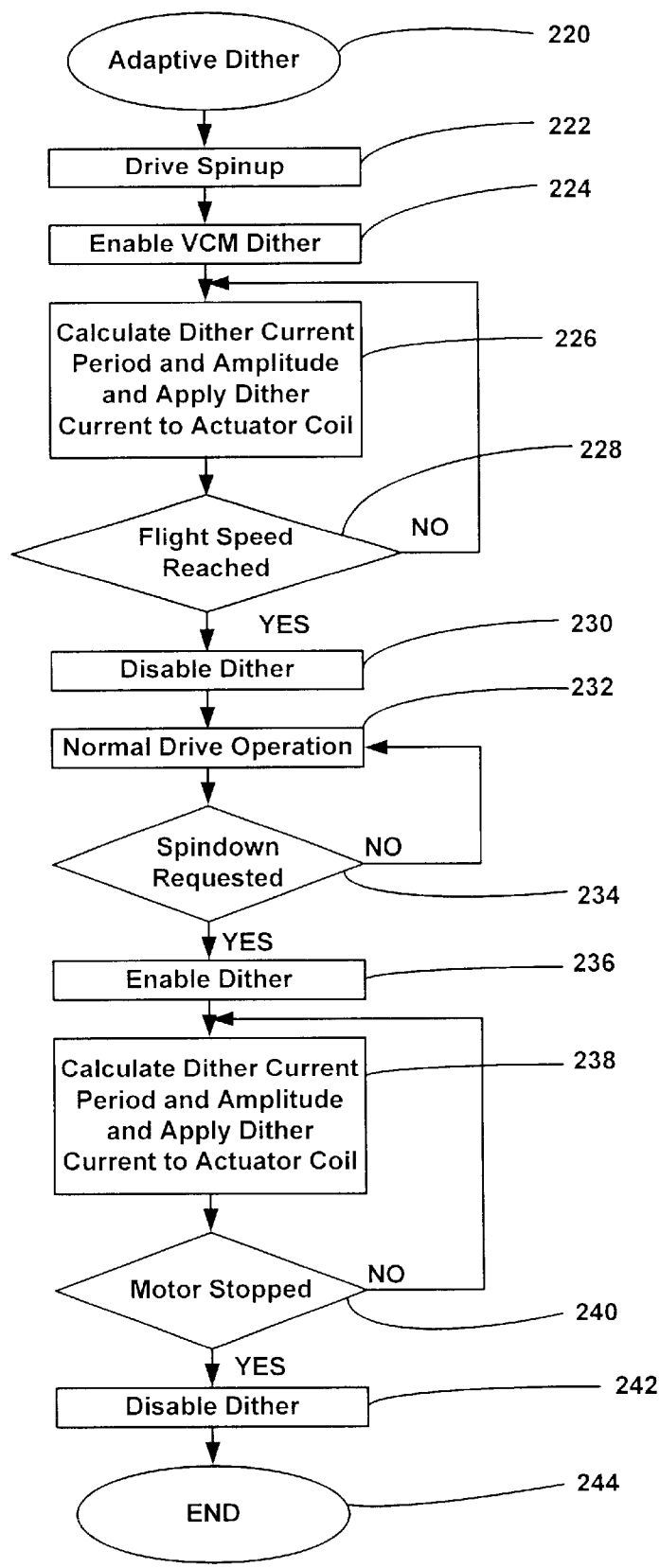
FIG. 10 is a flow diagram showing steps for applying a preferred embodiment of the method for wear reduction of a rotatable disc surface through implementation of controlled dither operations.

Turning now to FIG. 10, shown therein is a flow diagram of an ADAPTIVE DITHER routine 220. The routine of FIG. 10 is performed in conjunction with the routine of FIG. 9 and also preferably represents programming stored in the ARM memory 202 and executed by the ARM 200.

At step 222, the rotatable disc 106 begins to rotate as power is applied to the spindle motor assembly 104 and a dither operation is enabled at step 224. The dither operation begins at step 226, wherein a first dither current is selected and applied to the actuator coil 124. In a presently preferred embodiment, the parameters of the first dither current are selected in accordance with the sawtooth waveform 166 current profile of FIG. 6.

The magnitude of the dither current is calculated to be less than the magnitude of the Open Latch Current Threshold. In this way, the dither motion can be bounded by the crash stop 130 and the latch 136, without the risk of unintentionally opening the latch 136. It will be noted that variations in timing, amplitude, frequency and the duration of the dither operation are drive configuration dependent, and can vary as desired.

Next, a determination is made of whether the disc 106 has reached a rotational speed sufficient to launch the head 118 into flight, step 228. If the disc 106 has not reached the desired rotational speed, the process returns to step 226, where the application of the dither current to the actuator coil 124 continues. Once the head 118 has achieved flight, the dither operation is disabled, at step 230. At this stage, the actuator assembly 110 is freed from the latch 136 and the disc drive begins normal operation, step 232. Preferably, the amplitude of the current required to open the latch 136 is stored as an updated "Open Latch" current in the ARM memory 202 for use in a subsequent dither operation.

During the normal read/write operations of the disc drive 100, the dither process remains disabled. However, when a spindown operation is requested at step 234, the actuator assembly 110 is moved back towards the inner diameter of the disc 106 and captured by the latch 136. With the head 118 in flight above the landing zone 134, the dither operation is enabled at step 236. Based on the value stored during the execution of step 232, a dither current is selected and applied to the actuator coil 124. Preferably, the magnitude of the dither current is calculated to be less than the magnitude of the Open Latch Current Threshold.

In an alternative embodiment, the magnitude of the dither current selected at step 238 is selected in accordance with the Open Latch current value used to calculate the dither current at step 226. In this way, the Open Latch current is measured and stored on a periodic basis.

When the spindle motor assembly 104 and disc 106 have stopped rotating, the dither process is preferably disabled, steps 240 and 242, respectively. As such, the head 118 is dithered as its looses its lift and comes into contact with the landing zone 134, thereby reducing and dispersing contact-induced wear on the disc surface 108. The ADAPTIVE DITHER routine ends at step 244.

In accordance with one aspect of a preferred embodiment, the present invention provides a method for reducing and dispersing wear to the surface of a rotatable disc in a disc drive using an adaptive dither process, wherein the disc drive includes an actuator assembly that is secured in a parked position by a latch when not in use, the method includes determining a threshold current required to open the latch as the actuator assembly is moved from the parked position to a position over a user data storage portion of the disc (such as step 216); and subsequently applying a dither process to the actuator assembly to induce a reciprocating lateral displacement of the actuator assembly when the actuator assembly is secured in the parked position, wherein the maximum amplitude of the current of the dither process is selected to be less than the threshold current (such as steps 226 and 238.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

For example, although the preferred embodiment described herein is directed to a method for ware reduction of a rotatable disc surface of a disc drive system, it will be appreciated by those skilled in the art that the teachings of the present invention can be applied to other systems without departing from the scope and spirit of the present invention.

What is claimed is:

1. A method for reducing and dispersing wear to the surface of a rotatable disc in a disc drive using an adaptive dither process, wherein the disc drive includes an actuator assembly that is secured in a parked position by a latch when not in use, the method comprising:

determining an open latch current required to open the latch as the actuator assembly is moved from the parked position to a position over a user data storage portion of the disc; and subsequently applying a dither current to the actuator assembly to induce a reciprocating lateral displacement of the actuator assembly when the actuator assembly is secured in the parked position, wherein the maximum amplitude of the dither current is selected to be less than the open latch current.

2. The method of claim 1, wherein the actuator assembly includes a data transducing head and the rotatable disc includes a landing zone and wherein the subsequently applying step comprises applying the dither current to the actuator assembly while the head is in contact with the landing zone.

3. The method of claim 2 in which the head includes padded sliders.

4. The method of claim 2 in which the landing zone includes a textured surface.

5. The method of claim 1, wherein the subsequently applying step takes place while the disc is decelerated to rest.

6. The method of claim 1, wherein the subsequently applying step takes place while the disc is accelerated from rest to a nominal operational speed.

7. The method of claim 1, wherein the actuator assembly includes a contact arm that engages the latch during the subsequently applying step.

8. The method of claim 1, wherein the subsequently applying step further comprises determining a threshold current as a selected percentage of the open latch current and wherein the maximum amplitude of the dither current is selected to be less than the threshold current.

9. The method of claim 1, wherein the dither current follows a saw tooth profile.

10. A disc drive data storage device comprising:

a rotatable disc having a circumferential landing zone and a data storage portion;

an actuator assembly comprising a data transducing head and an actuator coil;

a latch configured to capture and retain the actuator assembly in a parked position when the head is moved to the landing zone, wherein application of an open latch current to the actuator coil causes the latch to toggle to an open position and permit movement of the head away from the landing zone and to a position adjacent the data storage portion; and a servo control circuit configured to determine the open latch current and to apply a dither current to the actuator coil to induce a reciprocating lateral displacement of the actuator assembly, wherein a maximum amplitude of the dither current is selected to be less than the amplitude of the open latch current.

11. The apparatus of claim 10, wherein the latch comprises a forward arm and a trailing arm.

12. The apparatus of claim 11, wherein the disc drive further comprises a magnet assembly that produces a magnetic field and wherein the latch comprises ferromagnetic members respectively supported by the forward and trailing arms and configured for immersion into the magnetic field.

13. The apparatus of claim 10, wherein the actuator assembly includes a contact arm that engages the latch during the application of the dither current to the actuator coil.

14. The apparatus of claim 10, wherein the landing zone is textured.

15. A disc drive storage device comprising:

a rotatable disc comprising a landing zone and a data storage portion;

an actuator assembly comprising a data transducing head and an actuator coil;

a latch configured to capture the actuator assembly in a parked position when the head is in proximity with the landing zone and to toggle to an open position to permit movement of the head to a position adjacent the data storage portion when an open latch current is applied to the actuator coil; and first means for determining the open latch current and for inducing a reciprocating lateral displacement of the actuator assembly while the actuator assembly is in the parked position by applying a dither current to the actuator coil having a maximum magnitude less than a magnitude of the open latch current.

16. The disc drive data storage device of claim 15, wherein the first means comprises a servo circuit configured to position the head with respect to the disc.

17. The disc drive data storage device of claim 16, wherein the servo circuit comprises a programmable processor with associated programs to determine the open latch current and induce the reciprocating lateral displacement.

* * * * *